Aug. 2, 1955  E. FERMI ET AL  2,714,577
NEUTRONIC REACTOR

Filed Nov. 2, 1945  2 Sheets-Sheet 1

Witnesses:
Herbert E. Metcalf
Estill E. Ezell

Inventors:
Enrico Fermi
Walter H. Zinn
By:
Attorneys

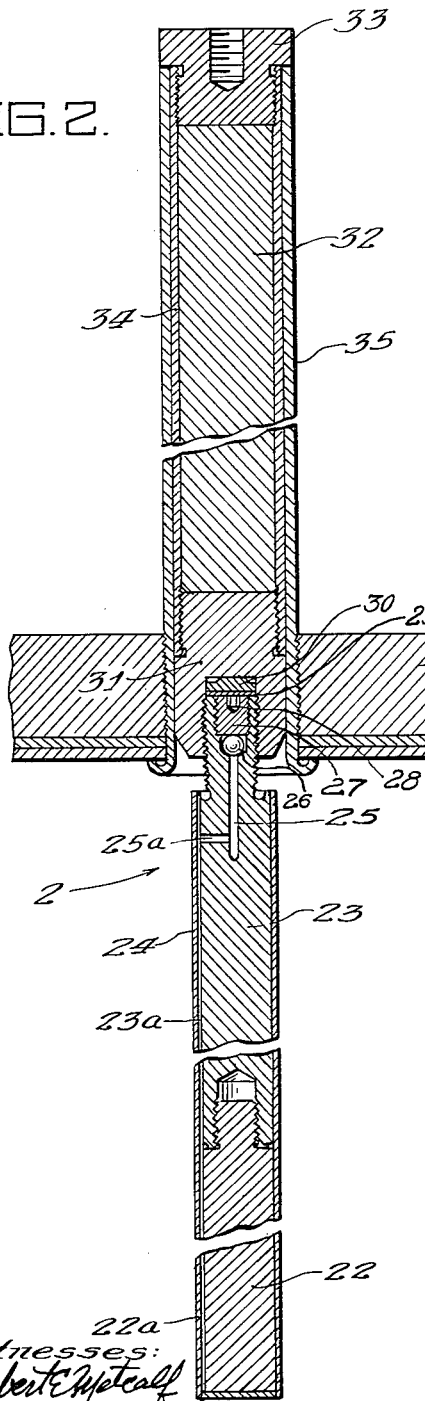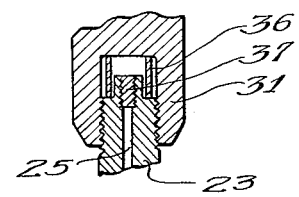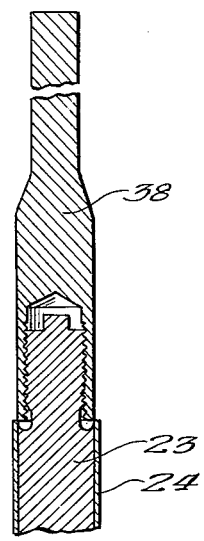

United States Patent Office 2,714,577
Patented Aug. 2, 1955

2,714,577

NEUTRONIC REACTOR

Enrico Fermi, Santa Fe, N. Mex., and Walter H. Zinn, Chicago, Ill., assignors to the United States of America as represented by the United States Atomic Energy Commission Application November 2, 1945, Serial No. 626,383

1 Claim. (Cl. 204—193)

The present invention relates generally to neutronic reactors and, more particularly, to novel articles of manufacture used in and in combination with such reactors, and to the combination of such novel articles of manufacture with neutronic reactors.

In neutronic reactors a thermal neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944.

More specifically, an object of the present invention is to provide novel shielding means for the active portion of a neutronic reactor adapted to be used in combination therewith.

Another object is to provide in a neutronic reactor a novel cooled shield.

Another object is to provide a novel composite rod adapted to be used as part of the active portion of a neutronic reactor.

Another object is to provide a novel rod for use as part of the active portion of a neutronic reactor which is constructed with fissionable material in a portion thereof only.

Another object is to provide in a neutronic reactor novel means for introducing foreign subject matter into the active portion of the neutronic reactor for bombardment by neutrons.

Another object is to provide in a neutronic reactor a novel collimated beam for utilizing the active effects of the neutronic reactor upon objects exposed exteriorly of the reactor.

Other objects and advantages will become more apparent from a study of the following description taken in conjunction with the accompanying drawings, in which:

Fig. 2 is an enlarged cross-sectional view of a rod assembly designated in Fig. 1;

Fig. 3 is an enlarged cross-sectional view of a modification of the ball valve seal shown in Fig. 2;

Fig. 4 is an enlarged sectional view of a supporting rod equipped with an adapter for the drawing process; and Fig. 5 is a sectional view taken along the line 5—5 of Fig. 3 in the direction indicated by arrows.

Figure 1:
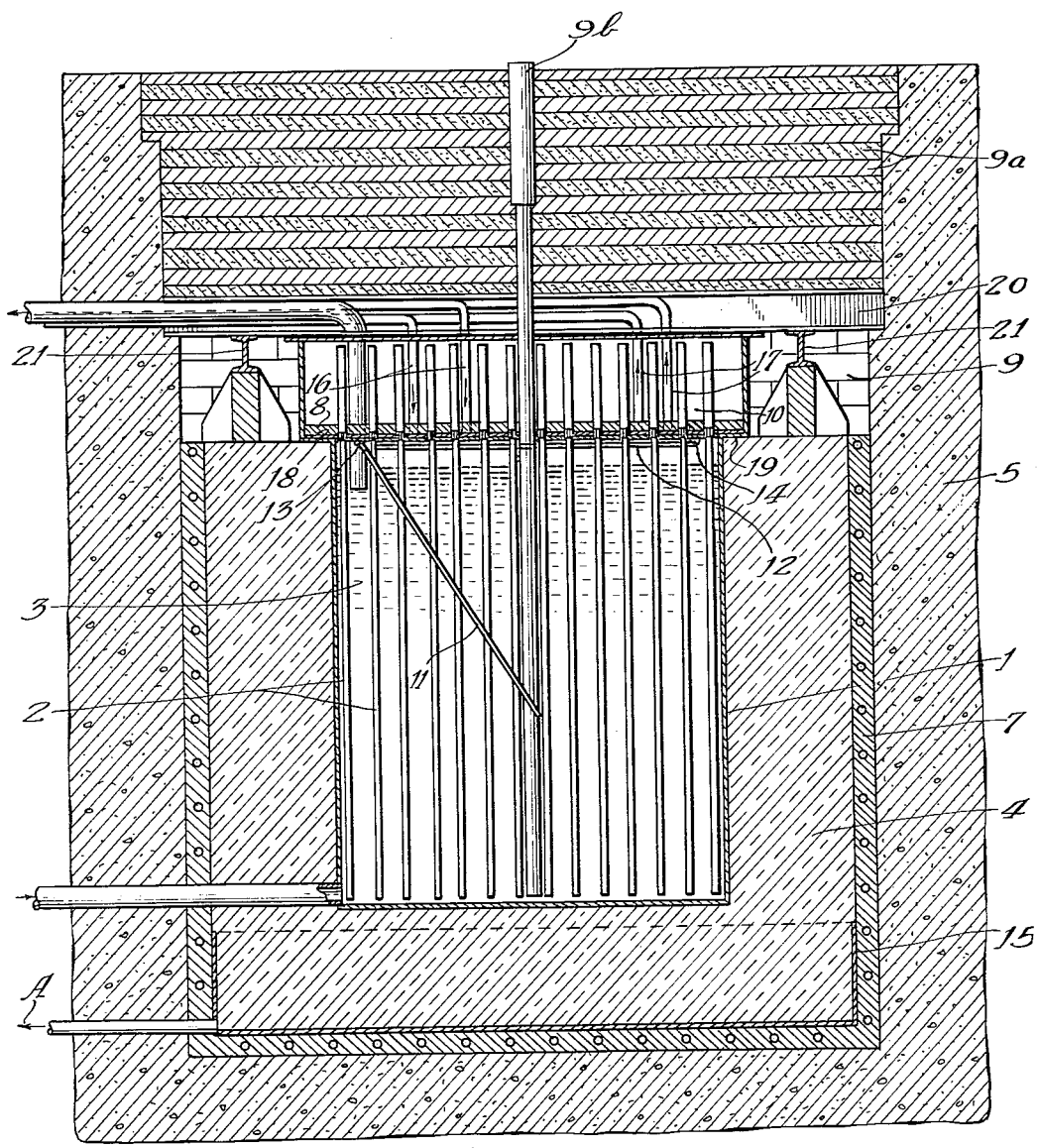
Fig. 1 is a central vertical cross-sectional view of a neutronic reactor embodying the present invention, being off-center as to the rod and well.

Referring to the drawing, numeral 1 denotes a neutronic reactor tank or container of cylindrical shape and of a material that is relatively noncorrodible at low temperatures and that is relatively non-absorbent with respect to neutrons, such as, for example, aluminum. A suitable size of such tank for a self-sustaining chain reaction is one that is 6 feet in diameter and 7 feet high, although other sizes may be used as well, particularly larger sizes. Suspended in tank 1 is a plurality of composite rods 2 of suitable configuration. Composite rods 2, described in detail hereinafter, are immersed in a neutron moderator, such as, for example, a body of deuterium oxide 3 substantially filling the tank 1 except for a small space above the surface which space is filled with helium, described later. More specifically, sufficient deuterium oxide is introduced into tank 1 so as to obtain a volume of uranium and heavy water slightly over the critical size.

Immediately surrounding tank 1 is a neutron reflector 4 of graphite, for example, having substantially a cup shape. Reflector 4 and tank 1, together with its contents, is referred to as the neutronic reactor. The active portion of the reactor is the volume of moderator and wetted uranium. The thickness of the graphite reflector may be of the order of two or three feet or more, depending on the size of the active portion of the reactor and the degree of scattering required. The reflector 4 reflects into the active portion of the reactor some of the neutrons that might otherwise diffuse out of the system. Graphite is a good scattering material having a low neutron absorption characteristic. Such elements as lead or bismuth may also be used. By using this peripheral layer of scattering or reflecting material, the overall size of the active portion of the reactor may be made somewhat smaller than in a case where no scattering layer is employed, since neutron losses to the exterior are somewhat reduced. Or tank 1 and its contents may be built slightly below critical size so that the addition of reflector 4 with its neutron reflecting action will convert the reactor from one that is not self-sustaining to one that is self-sustaining.

A concrete shield 5 surrounds the graphite reflector 4 and serves to prevent gamma and other penetrating radiations from escaping to the outside of the structure. The carbon in reflector 4, being a relatively light element, absorbs gamma rays only to a relatively small extent. The concrete shield may be of the order of 20 or 30 feet in thickness. The water of crystallization in the concrete absorbs escaping neutrons.

Generally speaking, the higher the atomic weight of an element, the better it serves as a shield to prevent escape of penetrating radiations, such as gamma radiations. Lead of a particular thickness is, therefore, an excellent shield for certain purposes while water of the same thickness is only fair, for example. However, thick water shields are convenient and satisfactory. Interposed between the concrete shield 5 and graphite reflector 4 is a cup-shaped cooled metal shield 7, preferably of a lead-cadmium alloy, having cooling tubes passing therethrough, through which light water, that is, ordinary water, or other coolant may be circulated. Shield 7 is especially adapted not only to cool the neutronic reactor but to minimize the escape of gamma and other penetrating radiations. A suitable thickness may be 4 inches or more.

A cover plate 8, for example, of stainless steel, is provided at the top of tank 1 and serves as a thermal shield as well as a support for control and safety rods pivotally supported thereunder, as is described later. Above the cover plate 8 there is a space 10, the use of which is pointed out below. A shield 9 of lead blocks is disposed above the reflector 4 and the shield 7. The space 10 is filled with lead, or the like. A biological shield 9a having alternate layers of iron and Masonite for preventing escape of gamma rays and other penetrating radiations through the top of tank 1 to the outside caps the reactor. A well 9b of any suitable diameter, for example 4 inches, extends through shield 9a, space 10 and plate 8 into the tank 1, preferably axially of the tank. Objects may be introduced from the exterior through the tube 9b into the center of the tank 1 so that they may be bombarded by high intensity neutron radiations.

In order to extract some of the heat developed as the result of the chain reaction and to provide a thermal operating equilibrium, a shielded heat exchanger (not shown) is provided, and the heavy water moderator 3 is circulated through conduits to the heat exchanger to be cooled thereby. A minimum of about 5 tons of heavy water and about 2 tons of uranium are necessary in reactor tank 1 to make the neutronic reaction self-sustaining. About 6 tons of heavy water is provided in the entire system, including the heat exchanger and other external parts. Of course, if additional cooling tubes are introduced into tank 1 to more effectively cool the uranium rods and heavy water, the neutron multiplication ratio (reproduction ratio) will be diminished because such cooling tubes absorb an appreciable percentage of neutrons, thereby acting as impurities, thus necessitating the addition of more heavy water and uranium to provide a larger active portion so that the reactor may be self-sustaining.

A pan 15 of stainless steel or other suitable material is located at the bottom of reflector 4 for collecting any heavy water that may leak from tank 1, inasmuch as heavy water, at present, is relatively scarce and expensive. The collected heavy water is drained as indicated by the arrow A.

Helium at substantially atmospheric pressure is introduced through pipes 16 into the top of reactor tank 1, that is, above the level of the heavy water, and thence is circulated to the exterior of the tank 1 through pipes 17. As the result of high neutron densities and heat developed during the operation of the chain reaction in tank 1 some of the deuterium oxide will decompose into $D_2$ and $O_2$. These uncombined gases will collect at the top of tank 1. In order to remove such uncombined gases, recombine and recondense them without explosive effect, a gas circulating system of any well-known type (not shown) may be used for circulating the helium together with the uncombined gases into a recombiner of any well-known type (not shown) such as a hot grid or platinum-charcoal catalyst, or both, for effecting recombination of the $D_2$ and $O_2$ into heavy water, and for returning the condensed $D_2O$ into tank 1, or, in fact, to any other suitable place, for example, to a heavy water storage tank (ont shown). Helium may be circulated, for example, at the rate of 3 cubic feet per minute. A suitable ratio of $D_2$ to helium may be 1 to 150 although other dilutions may be used instead.

Immediately below coverplate 8 there is provided a cadmium sheet 18 to act as a shield for minimizing the escape of slow neutrons. Immediately below cadmium sheet 18 there is provided an aluminum sheet 19 which is useful primarily to prevent electrolytic action between otherwise dissimilar metals (cadmium and aluminum) in the interior of tank 1. Cadmium sheet 18 is sandwiched between coverplate 8 and aluminum sheet 19 by bolts and nuts (not shown) or other suitable fastening means. Shield 9a is supported by two pairs of crossed I beams 20 and 21. The lower I beams 21 have their extremities supported by the concrete shield 5—in other words, the ends of these I beams extend beyond the periphery defined by the shield 7, hence there are provided four supporting points for the lower pair of I beams 21.

Referring to Fig. 2, there is shown one of the plurality of composite uranium containing rods 2 that are suspended in the deuterium oxide moderator 3 as shown in Fig. 1. Each composite rod 2 comprises a cylindrical rod of uranium or uranium containing material 22 that is screw-threaded into a supporting rod 23 of non-fissionable material such as, for example, aluminum. A thin tubing of aluminum 24 is drawn on to the outer surface of uranium rod 22 and supporting rod 23 by any well-known drawing process by screwing on an attachment 38 (see Fig. 4) that is subsequently removed. Thereafter, the joints formed at the top of supporting member 23 and at the bottom of rod 22 are welded so as to form an airtight seal in tubing 24, thus protecting the uranium rod 22 from the effects of the surrounding medium. Narrow longitudinal connecting grooves 22a and 23a are provided in the connected elements 22 and 23. An axial groove 25 and communicating radial groove 25a are provided near the top of supporting rod 23 and communicate with the grooves 22a and 23a thereby making it possible to evacuate any air, and thereby to test for possible leaks in the welded joints in tubing 24 by noting the interior pressure after a predetermined evacuation. A ball valve 26 is provided to seal the groove 25 from the surrounding atmosphere. A set screw 27 having a hexagonal socket 28 is screwed downwardly of supporting rod 23 so as to firmly seat the ball valve 26. A lead gasket 29 with a serrated surface is placed above set screw 27 and a steel disc 30 is placed on top of lead gasket 29 so as to complete an airtight seal between set screw 27 and supporting member 23 as shank 31 and supporting member 23 are screw-threaded together. An aluminum sleeve 34 is screw-threadedly connected to shank 31, the latter receiving screw-threadedly a member 33. A lead rod 32 is disposed between the shank 31 and flanged member 33 as a supplemental biological shield. The flange of member 33 is supported on the upper end of a tube 35 which is threadedly supported by the plate 8, the bottom edge of the tube 35 being peened as shown. The aluminum sleeve 34 surrounds the lead rod 32 so as to prevent direct contact between the lead rod 32 and any medium surrounding the sleeve 34 when removed from tube 35. As is clear from the above description, the entire composite rod 2 may be removed for replacement by sliding the rod 2 upwardly through the tube 35. While sleeve 34 and tubing 24 have been described as being of aluminum, it will be apparent that other non-fissionable materials that are relatively non-corrosive with respect to heavy water vapor and that have a small absorption cross-section for neutrons may be used, such as, for example, beryllium, or even stainless steel.

The heavy water level is located well above the top of uranium rods 22, so that it wets a substantial portion of the aluminum covering of supporting rod 23. The volume of heavy water above the top surface of uranium rods 22 will act as a neutron scattering or reflecting material rather than as an additional portion of the active uranium-heavy water volume of the neutronic reactor. By raising the level of the heavy water, greater neutron reflecting action may be obtained without adding to the active volume of the neutron reactor.

Fig. 3 shows an alternate form of seal which may be used in place of the ball valve 26 shown in Fig. 2. The seal comprises a stud 37 of aluminum, for example, that is screw-threaded into a projecting collar portion of supporting member 23. A gasket or sealing ring 36 of lead, for example, is provided between elements 23 and 31 so that as the latter-mentioned elements are screw-threaded together, they compress gasket 36 thereby forming an airtight seal between supporting rod 23 and shank 31.

The neutron chain reaction may be stopped merely by immersing into the heavy water one or more rods, such as rods 11 and 12 (Fig. 1) of neutron absorbing material, pivotally supported by the stainless steel plate 8. A suitable neutron absorbing material is cadmium, for example. Rod 11, for example, may be operated as a control or regulating rod, being intermittently immersed into and with-drawn out of the body of heavy water, as desired. Rod 12 (shown out of the heavy water) may be considered as a safety rod which normally is held out of contact with the body of heavy water in tank 1 and is immersed into the heavy water only for emergency purposes, that is, when control rod 11 per se, is insufficient for immediate stoppage of the chain reaction. Rod 11 may be pivotally mounted and rigidly secured to a shaft 13, extending through the tank 1 through stuffing box types of bearings (not shown) and through reflector 4 and the concrete shield 5 to the exterior so that shaft 13 may be rotated from the exterior of the concrete shield either manually or automatically, as desired. Shaft 14 is rigidly connected to rod 12 and extends through the reactor and concrete wall 5 in a manner similar to shaft 13. A method of automatic control is to make rotation of shaft 13 responsive to the neutron density at a peripheral portion of reflector 4, for example, as indicated by ionization chambers having suitable amplifiers (not shown) so as to be effective to control the neutron density of the reactor and keep it substantially constant. Such means of automatic control, however, forms no part of the present invention.

In utilizing the output of the reactor, well 9b plays an important role. It extends through the center of the reactor where the highest neutron density exists, and intense neutron bombardment of materials inserted into this well will take place, even at relatively low reactor powers. A sufficiently high reproduction ratio $r$ is provided to supply the extra neutrons required. Furthermore, the well acts to collimate the fast neutrons released at the center of the reactor and a high density collimated beam of neutrons emerges through the open end of well 9b, projected upwardly, this collimated beam having a far greater neutron density than any neutron produced at a given reactor power, can be utilized outside of the reactor for nuclear research in all of its aspects.

In addition, extremely high energy gamma rays are emitted during nuclear fission. These rays also escape through well 9b to the exterior of the reactor and can there be used for taking radiographs through large castings, for example, with relatively short exposure, during operation of the neutronic reactor. The neutrons coming from the reactor can be screened out of the gamma ray beam by the use of relatively thin sheets of materials having high neutron absorption cross-sections without substantially reducing the gamma ray intensity. In addition, a bismuth filter has been found to effectively reduce the gamma rays, without substantial interference with the neutron beam. Thus well 9b can be used either to produce a high intensity collimated neutron beam, or to produce a high energy beam of gamma rays, as desired, both for use either inside or outside the reactor.

While the theory of nuclear fission of uranium as set forth herein, is based on the best presently known experimental evidence, we do not wish to be bound thereby, since additional experimental evidence, later discovered, may modify the theory disclosed. Any such modification of theory however, will in no way affect the results to be obtained in the practice of the invention herein described and claimed.

It should be noted that the system described above is merely exemplary, and not limiting insofar as our invention is concerned, since it will be apparent that other similar systems will be suggested to those skilled in the art. Hence, our invention is limited only insofar as is set forth in the following claim.

What is claimed is:

In a neutronic reactor, a container, a cover therefor, a plurality of composite rods suspended from the cover so as to extend well into the tank, each rod being composed of an aluminum portion extending into the tank from the cover and a thermal-neutron-fissionable portion secured to a region of the aluminum portion spaced from the cover and extending from the aluminum portion in a direction away from the cover, and heavy water filling the container to a level above the juncture of the fissionable portion with the aluminum portion for each composite rod so as to cause the fissionable portion to be wholly immersed, variation in the level of the heavy water serving to vary the amount of heavy water above the fissionable portions and thus to vary the neutron-reflecting action of the heavy water.

References Cited in the file of this patent

UNITED STATES PATENTS

| 507,374 | Lyte | Oct. 24, 1893 |
| 578,070 | Woolf | Mar. 2, 1897 |
| 667,498 | Chapman | Feb. 5, 1901 |
| 983,962 | Werner | Feb. 14, 1911 |
| 1,970,804 | Kerk | Aug. 21, 1934 |

FOREIGN PATENTS

| 114,150 | Australia | May 2, 1940 |
| 861,390 | France | Oct. 28, 1940 |
| 233,011 | Switzerland | Oct. 2, 1944 |
| 233,278 | Switzerland | Oct. 16, 1944 |

OTHER REFERENCES

Atomics, vol. 6, No. 6, November-December 1950, pages 10–15. Pub. bi-monthly by Technical Pub. Co., Chicago, Ill. (Copy in Patent Office Library.)

Kelly et al., Phy. Rev. 73, 1135–9 (1948). (Copy in Patent Office Library.)